United States Patent Office 2,752,399
Patented June 26, 1956

2,752,399

2 HYDROXY 1,1,1-TRIMETHYLOL PROPANE

Walter Grimme, Utfort, Moers, and Johannes Wöllner, Moers, Germany, assignors to Rheinpreussen Aktiengesellschaft fuer Bergbau und Chemie, Homberg, Niederrhein, Germany, a corporation of Germany No Drawing. Application July 29, 1954,
Serial No. 446,657

Claims priority, application Germany August 3, 1953

2 Claims. (Cl. 260—635)

This invention relates to and has at its object the production of 2 hydroxy 1,1,1-trimethylol propane.

The 2 hydroxy 1,1,1-trimethylol propane in accordance with the invention may be designated as 2 hydroxy 1,1,1-trimethylol propane, or 1,1,1-trimethylol isopropanol, and has the formula

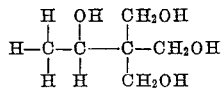

In accordance with the invention, it has been found that the novel compound, 2 hydroxy 1,1,1-trimethylol propane may be produced by the hydrogenation of 1,1,1-trimethylol acetone at normal or increased pressure and at normal or increased temperature in the presence of a hydrogenation catalyst.

The pressure and temperature used for the hydrogenation is dependent upon the hydrogenation catalyst. Pressures in the range of atmospheric pressure to 300 atmospheres, preferably pressures from 60 to 120 atmospheres, and temperatures from 10 to 150° C. may be used. Any conventional hydrogenation catalyst may be used, such as, for example, Raney nickel, platinum oxide, platinum black, cupric oxide-chromic oxide catalysts, zinc oxide-chromic oxide catalysts; nickel deposited on carriers such as pumice, kieselguhr, silicagel, or alumina platinum or palladium on carriers, such as pumice, silicagel, kieselguhr, alumina, barium sulphate, or activated coal. The catalysts are used in an amount of 1 to 30% related to the quantity of the starting 1,1,1-trimethylol acetone. By using precious metals as catalysts, an amount of 0.1 to 5 per cent is sufficient. The hydrogenation is carried out in the presence of a solvent, such as water, dioxane, or alcohols of low molecular weight, especially alcohols with 1 to 4 carbon atoms, such as methanol, ethanol, propanol, isopropanol, primary butanol or secondary butanol. It is preferred to use at least one part of weight of the solvent on one part of weight of 1,1,1-trimethylol acetone.

The starting 1,1,1-trimethylol acetone may be produced according to our co-pending U. S. patent application, Serial No. 429,694, filed May 13, 1954.

The new polyalcohol in accordance with the invention constitutes a valuable addition to the known polyalcohols and is excellently suited as the alcohol component in the production of synthetic resins, especially in the production of modified alkyd resins and as intermediate products in the formation of artificial materials. The new polyalcohol may also be used for the production of explosives by nitration.

The following example is given by way of illustration and not limitation:

Example 300 g. of trimethylol acetone produced in accordance with U. S. application, Serial No. 429,694 having a melting point between 67 and 68° C., were dissolved in 1 liter of isopropanol. The mixture of the acetone and alcohol were placed in a 2-liter autoclave, provided with a stirrer, to which was added 100 g. of a Raney nickel catalyst. Hydrogen was passed into the autoclave to a pressure of 100 atmospheres gauge with the hydrogenation commencing at room temperature. Hydrogenation was quickly effected with the temperature rising to about 40° C. After about 40 minutes, the pressure decrease, caused by the taking up of hydrogen ceased, and the pressure had dropped to 71 atmospheres gauge. No further taking up of hydrogen could be observed. The pressure was released from the autoclave and the reaction mixture was suction-filtered from the catalyst. Thereafter the solvent isopropanol was distilled off under vacuum. A residue of 280 g. remained, which consisted of the crude 2 hydroxy 1,1,1-trimethylol propane. By repeated recrystallization from isopropyl alcohol there was obtained 2 hydroxy 1,1,1-trimethylol propane having a melting point of between 144 and 145° C. After further repeated recrystallization, the melting point of the product rose to 149° C. The 2 hydroxy 1,1,1-trimethylol propane thus formed had a boiling point between 208 and 209° C. with an absolute pressure of 1 mm. Hg, and showed the following analysis:

Calculated: 48.0% C, 9.33% H. Found: 47.91% C, 9.12% H.

We claim:

1. As a new chemical compound, 2 hydroxy 1,1,1-trimethylol propane.

2. Method for the production of 2 hydroxy 1,1,1-trimethylol propane which comprises hydrogenating 1,1,1-trimethylolacetone in the presence of a hydrogenation catalyst at temperatures from 10 to 150° C., and pressures from 1 to 300 atmospheres, preferably from 60 to 120 atmospheres, in the presence of a solvent, and recovering the 2 hydroxy 1,1,1-trimethylol propane formed.

References Cited in the file of this patent

FOREIGN PATENTS

| 722,554 | Germany | May 28, 1942 |
| 576,842 | Great Britain | Apr. 23, 1946 |